P. BROADBOOKS.
HOOF PARER.
APPLICATION FILED MAY 19, 1909.

943,382.

Patented Dec. 14, 1909.
2 SHEETS—SHEET 1.

Witnesses
M. E. Fowler
James B. Mansfield

Inventor
Peter Broadbooks
By Alexander & Fowell
Attorneys

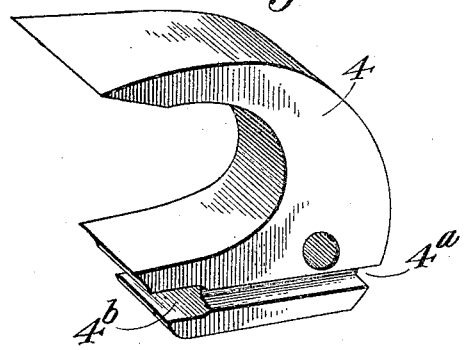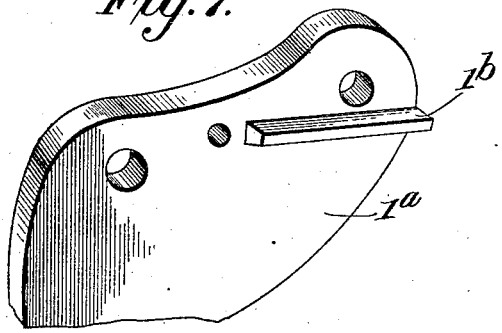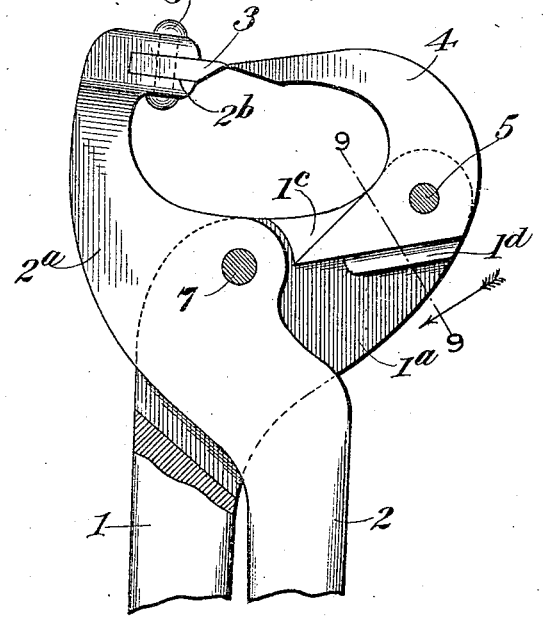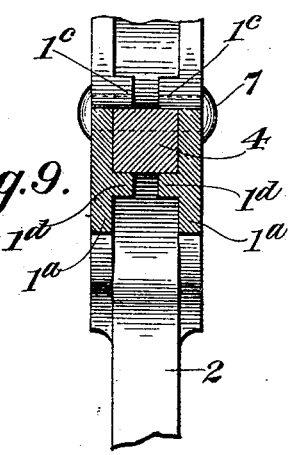

ns.

UNITED STATES PATENT OFFICE.

PETER BROADBOOKS, OF BATAVIA, NEW YORK.

HOOF-PARER.

943,382. Specification of Letters Patent. Patented Dec. 14, 1909.

Application filed May 19, 1909. Serial No. 497,069.

*To all whom it may concern:*

Be it known that I, PETER BROADBOOKS, of Batavia, in the county of Genesee and State of New York, have invented certain new and useful Improvements in Hoof-Parers; and I hereby declare that the following is a full, clear, and exact description thereof, reference being had to the accompanying drawings, which form part of this specification.

This invention is an improvement in hoof parers and its objects are (1) to make a tool of this kind that shall be light in weight yet very strong and durable; (2) to construct the jaws of the tool so that they may be more easily assembled and disconnected; (3) to make a tool of this description with the necessary space back of the main cutting jaws required for the clearance of the hoof parings. The main jaw is formed with a deep curved long and narrow neck which furnishes an unusual amount of open space and clearance for the parings to escape, and which enables the cutting edge thereof to enter the horny substance of the hoof with greater freedom, the shank of said jaw being fixedly but removably held in the bifurcated handle by means of a pin and a brace. The other handle is also fulcrumed between the bifurcations of the first named handle and is formed with a head in which is milled a groove in which is held the opposing jaw or cutter; and (4) to construct a hoof parer containing all these requirements and yet be inexpensive to manufacture.

The invention will be clearly understood from the accompanying drawings which illustrate several hoof parers all embodying the essential features of the invention which I will now explain in detail with reference to said drawings.

Figure 1:
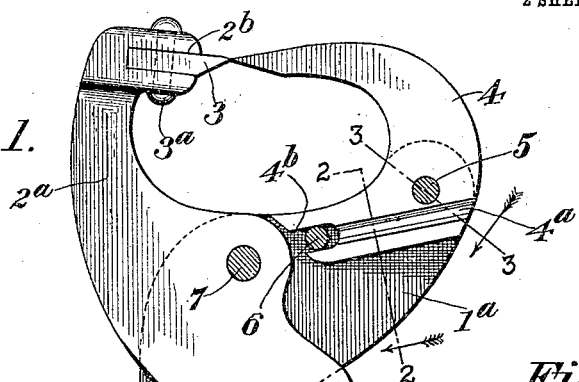
Figure 2:
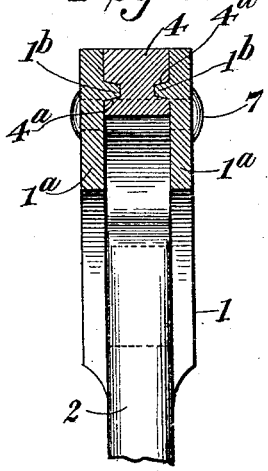
Figure 3:
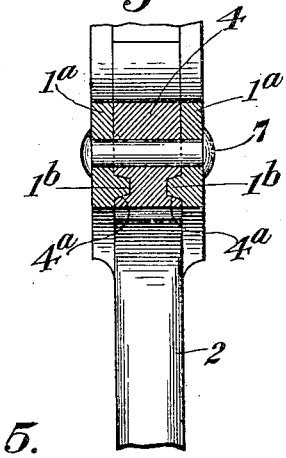
Figures 4, 5:
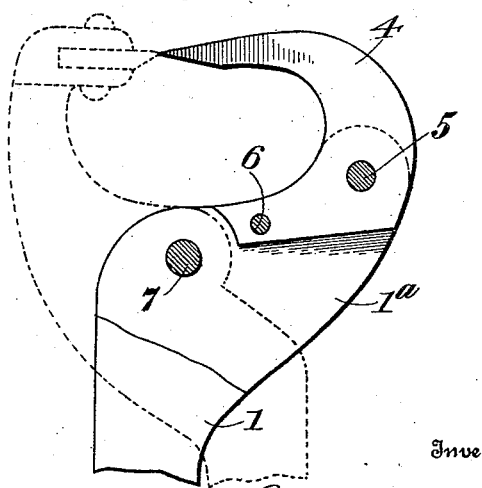

In the drawings—Figure 1 is a side view of the cutter closed, with one member of the bifurcated handle broken away to show the removable jaw cutter. Fig. 2 is a section on the line 2—2, Fig. 1. Fig. 3 is a section on line 3—3, Fig. 1. Fig. 4 is a detail top perspective view of the jaws. Fig. 5 is a view showing a slight modification of the detachable jaw cutter. Fig. 6 is a perspective view of one form of detachable jaw cutter. Fig. 7 is a detail view of one of the bifurcated handle members. Fig. 8 is a detail view similar to Fig. 1 showing another modification of the detachable jaw cutter. Fig. 9 is a section on line 9—9, Fig. 8, with the detachable jaw removed.

As shown the implement comprises two handles 1 and 2, the former of which is bifurcated to embrace the handle 2 at the pivotal point; and said handles are connected by means of a pivot bolt 7; handle 2 is formed with an integral jaw $2^a$ above the pivot 7, which jaw has a slot $2^b$ in its inner end in which is placed a removable short cutter 3 which may be secured in the slot by screws or rivets $3^a$ as shown.

The members $1^a$ of the bifurcation of handle 1 extend only a short distance above and to one side of the pivot 7; and between these members is secured a removable or detachable combined cutter and jaw 4, which is adapted to be detachably secured between members $1^a$ of handle 1, by means of a pin or bolt 5 which transfixes the members $1^a$ and the base of the cutter and jaw 4, as shown. To hold the combined cutter and jaw 4 rigidly in position and prevent it oscillating on the bolt 5,—the lower end thereof is extended inwardly toward the pivot 7 but not into contact with the handle 2, and the inner end of the jaw is preferably slotted as at $4^b$ to engage a rivet or pin 6 transfixing the members $1^a$ of the bifurcation; and of course when the slot $4^b$ is engaged with the rivet 6, and the pin 5 is in place, the combined cutter and jaw 4 is rigidly held in position. The sides of the shank of the jaw 4 may be grooved as indicated at $4^a$ to engage ribs $1^b$ on the inner sides of the members $1^a$, as shown in Figs. 1–3, and obviously the grooves and ribs might be transposed in position, and will effectively prevent lateral oscillation of the combined cutter and jaw on the handle 1.

In lieu of the ribs $1^b$ members $1^a$ might be provided on their inner faces with ribs $1^c$, $1^d$, between which the shank of the jaw 4 may be inserted (see Figs. 8–9), and these would effectively prevent lateral oscillation of the jaw. It will be observed that in all these constructions the combined cutter and jaw 4 can be readily detached from the handle 1 by simply loosening bolt 5, and the shank or base of the jaw 4 is locked against oscillation by being engaged with the members $1^a$ in various ways, several of which are indicated in the drawings.

In each instance the main jaw 4 is formed with a deep curved long and narrow neck which affords a large open space for clearance of the parings, and the cutting edge of jaw 4 will enter the horny substance of the hoof with greater freedom, while its shank is fixedly held between the members of the bifurcated handle. The other handle is fulcrumed in the bifurcation of the first named handle, and its head is grooved to hold the opposing cutter. It is a well known fact that the outer part of an animal's hoof is the harder, but cutter 3 does not enter the hoof to any great extent, and therefore need not be shaped like the main cutter and jaw 4; and for this reason I have given all surplus space to said main jaw, and this is highly important and very essential in a tool of this description. Another essential point is, by having one handle fulcrumed in the bifurcations of the other handle; as shown I can place the fulcrum or pivot 7 nearer to the cutting edges, thereby not only gaining more power, but also a larger opening or clearance space back toward the fulcrum when the jaws are open, on account of the very short distance in the joint at that point. By having the combined cutter and jaw fixedly held between the members of the bifurcation as shown, it can be attached or disconnected without removing the fulcrum pivot 7; this is also highly important as the handles of this hoof parer may be made of malleable iron castings, and the jaws of steel, therefore a reliable tool can be produced at less expense.

Having described my invention what I claim as new and desire to secure by Letters Patent thereon is:

1. A hoof parer comprising a bifurcated member having a handle, and an opposed member comprising a handle pivoted in the bifurcation of the first member and a jaw above the pivot provided with a cutter; with a detachable combined cutter and jaw having a shank and a long curved neck terminating in a cutting edge, devices for locking the inner end of said shank to the sides of the bifurcation of the bifurcated member to prevent oscillation of the combined cutter and jaw, and a bolt transfixing the bifurcation and the shank of said combined cutter and jaw to fasten the latter to the bifurcation; and whereby upon removing said bolt the combined cutter and jaw may be removed.

2. In a hoof parer the combination of a handle having an integral jaw, a cutter attached to said jaw, and a bifurcated handle pivoted to the first handle, its bifurcation projecting beyond the pivot; with a removable combined cutter and jaw placed between the bifurcation of said handle and having a long curved neck terminating in a cutting edge adjacent the opposite cutter, and having a shank fitted between the members of the bifurcated handle, interlocking devices between the shank and said members to prevent oscillation of the cutter and jaw, and a bolt transfixing the extremities of the bifurcation and the shank of said combined cutter and jaw, by removing which bolt the jaw may be removed or replaced.

3. A hoof parer comprising a bifurcated member having a handle, an opposed member comprising a handle, and a head portion pivoted in the bifurcation of the first member, and an integral jaw above the pivot provided with a cutter; with a detachable combined cutter and jaw having a shank engaged in the bifurcation above the pivot and having a long curved neck terminating in a cutting edge opposite the cutter on the other jaw, a slot in the inner end of said shank engaging a pin transfixing the bifurcation, and a bolt transfixing the extremities of the bifurcation and the shank of said combined cutter and jaw by removing which the jaw may be removed or replaced.

4. In a hoof parer the combination of a bifurcated member having a handle, an opposed member comprising a handle, a head portion pivoted in the bifurcation of the first member and having an integral jaw above the pivot formed with a groove in its inner face and a cutter fastened in said groove; with a detachable combined cutter and jaw having a shank fitted in the bifurcation and having a long curved neck terminating in a cutting edge opposite the cutter on the other jaw, devices for locking the shank to the members of the bifurcations to prevent oscillation of the jaw, and a bolt transfixing the extremities of the bifurcation and the shank, by removing which the jaw may be removed or replaced.

In testimony that I claim the foregoing as my own, I affix my signature in presence of two witnesses.

PETER BROADBOOKS.

Witnesses:
    J. PIERCE DALZELL,
    WILLIAM E. WEBSTER.